Jan. 2, 1940.  C. J. RAY  2,185,520
LISTER PLOW
Filed Nov. 23, 1938

INVENTOR.
Charles J. Ray
BY
ATTORNEY.

Patented Jan. 2, 1940

2,185,520

UNITED STATES PATENT OFFICE 2,185,520

LISTER PLOW

Charles J. Ray, Denton, Nebr.

Application November 23, 1938, Serial No. 241,985

4 Claims. (Cl. 97—204)

My invention relates to listers, its primary object being the modification of the ordinary lister plow for materially improving the tillage methods.

One of the objects of my invention is the provision of a modified lister plow which will prepare the lister ridges and furrows to provide water storage reservoirs without the use of dams in the furrows.

Another object is the provision of an improved lister plow having means for severing the roots of weeds in the ridges.

Another object is the provision of an improved lister plow having means for increasing the stability of the plow when operated in uneven soils.

Another object is the provision of a new tillage method involving the storage of water and the destruction of weeds.

Having in view these objects and others which will be pointed out in the following description, I will now refer to the drawing, in which Figure 1 is a plan view of a lister plow share as modified with a provision of specialized wings.

Lister plows are distinctly furrow forming plows, forming relatively deep furrows with relatively high ridges at the sides of the furrows. They distinguish sharply over the cultivator tools whose function is to stir the surface of the soil without the formation of ridges or furrows.

At 10 is shown the ordinary lister plow share including the added wings 11 as contemplated in my invention. The share 10 is provided with the usual bolt holes 12 for securing the share in place. The structure and function of these wings have a definite relation to the structure and function of the lister plow.

Lister plows are designed to cut relatively deep furrows and to throw up the soil at the sides to form high ridges. The next adjacent furrow is parallel to the previous furrow and half the soil is thrown off onto a previous ridge. The plowing is thus continued until the surface of the entire field is covered with parallel ridges and furrows. The ordinary mold board plow on the other hand throws the furrow slice into the previously formed furrow in order to preserve a substantially level field. Most plows are designed to cause the breaking up of the furrow slice in turning over so as to result in a field having few clods and few air spaces. This may be supplemented in the ordinary plowing with a harrow to break up the clods and to compact the soil, but in listed fields a similar result is obtained by methods to be subsequently described.

Figure 1:
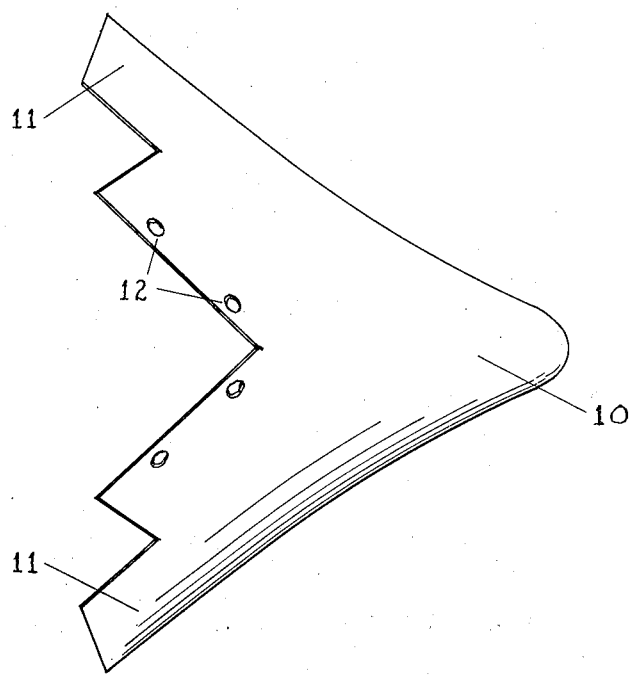
Figure 2:
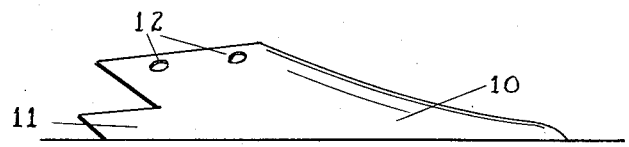
Figure 2 is a view in side elevation of the same plow share.
Figure 3:
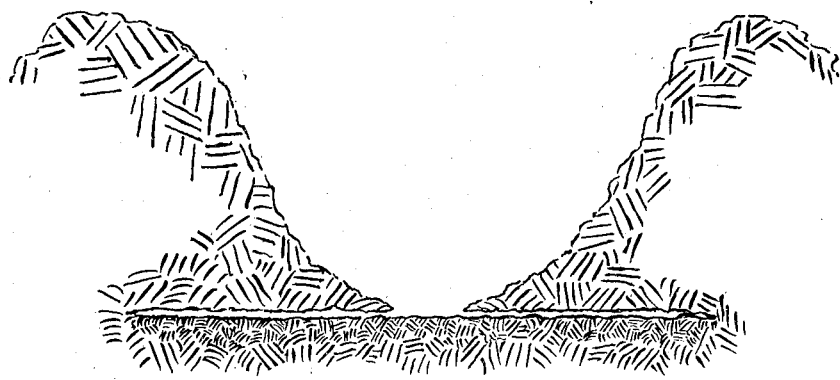
Figure 3 is a cross sectional view of a fragment of a field after listing.

Referring now to Figures 1 and 2, it will be seen that the forward travel of the share 10 will sever the surface soil from the subsoil, the cutting edge of the plow being triangular and the width of the furrow slices being substantially equal to the base of the triangular cutting edge. During the forward movement of the share under the furrow slice the share acts as a wedge to pry the furrow slice upwardly and away from the subsoil. The weight of the furrow slice is carried by the share but the furrow slice is immediately divided longitudinally by the ridge of the plow share with the result that substantially equal portions of the furrow slice are thrown toward the opposite sides of the share to build up the ridges. The movement of the furrow slice is spiral but most soils are sufficiently friable so that the ridges are formed of loose soil.

The wings 11 project from the opposite sides of the share at the bottom thereof and the curvature continues that of the share. They may be either welded onto the share, or the share may be cut and formed integral with the wings. The wings must project transversely of the line of draft and the width and height of the wings must be such that there will be little movement of the soil either upwardly or laterally. The bottom edges of the wings are in the plane of the bottom edge of the lister plow and the top edges of the wings must be in a plane which is not higher than the plane at which the turning movement of the furrow slice begins. The thrust of the wings is forward and upward but the horizontal component of this force is resisted by the unworked soil through which they travel. The vertical component of the force is slight so that it merely elevates slightly the soil underneath which the wings travel, this being in the bottom of the ridge.

Lister plows compact the soil over which they travel so that the bottom of the furrow is harder than the subsoil. The hard smooth layer retards water absorption. On the other hand, the ridge of loose soil absorbs water readily except when the rain fall is heavier than the rate of absorption. The water which is not absorbed in the soil is wholly wasted instead of being conserved for use during later dry spells. Not only is the water wasted, but valuable surface soil is carried down the furrows in streams of water.

The gashes formed by the wings extend an appreciable distance under the ridges and they naturally increase water absorption of the ridges besides functioning as temporary reservoirs which retain the water during absorption in the soil. Functionally the tillage method resembles that of throwing up dams in the furrows, but the cost of forming the gashes is very much less than that of forming dams. In the usual "run-off" rains the gashes will accomplish everything that the dams will accomplish and at much less labor and expense. The gashes may, however, be provided to supplement the dams in very wet seasons.

In the usual practice, corn and similar crop seeds are deposited in the bottom of the furrows and lightly covered with soil. During the growing season the field is cultivated, and the successive cultivations gradually reduce the ridges by depositing some of the soil into the furrows. The cultivation disturbs the weeds but the weeds which are too close to the crop line cannot readily be removed without disturbing the crop. This is particularly true of such deep-rooted perennials as bindweed. The cutting of the gashes not only severs the bindweed roots but it displaces the upper portion of the root. The plane of severance is the critical plane since it functions before the planting of the seed to seriously disturb the weeds in the crop line and to a considerable distance on both sides thereof, the weeds at the greater distance from the crop line being kept under control by cultivation.

Lister plows are frequently used for fall plowing to prepare the seed bed for a corn crop the following year. The ridges and furrows are subjected to repeated freezing and thawing and they accumulate considerable rain water and snow. The roots of the perennial weeds are severed by the wings at the very beginning so that the weeds are killed during the winter. In the spring the soil is again worked, the operation being known as "ridge busting". The ridges are split and the former furrows are filled and new furrows are formed where the previous ridges were before. Weeds are again disturbed and cut by the wings at a time when the weeds are in a seriously weakened condition. All of the moisture of the winter has been conserved but the spring listing opens up new gashes for the retention of moisture from the spring rains.

While no dynamometer tests have been made, the field operation seems to indicate that the wings add no appreciable resistance. This is indicated by the fact that the implement will cover about the same ground in the same time whether used with or without the wings. When pulled by a tractor there is no appreciable addition to the fuel required due to the wings. On the other hand, it has been found that the wings have a very marked stabilizing effect to maintain the lister at the desired depth in the soil. The importance of this is particularly evident when working a field which has hard and soft spots in the soil.

Having thus described my invention in such full, clear, and exact terms that its construction and operation will be readily understood by others skilled in the art to which it pertains, what I claim as new and desire to secure by Letters Patent of the United States is:

1. A lister plow for forming lister ridges and lister furrows with a plow sole at the bottom of the furrows, and upwardly and rearwardly inclined wings at the sides of said lister plow and having a curvature which is continuous with the curvature of said lister plow, said wings being adapted to cut horizontal gashes underneath the ridges and on a level with the bottom of the furrows.

2. A lister plow for cutting furrows and turning the soil to form ridges at both sides of the furrow, wings projecting from said lister plow at both sides thereof and integral therewith, said wings having cutting edges in the plane of the cutting edges of said lister plow and continuous with the curvature thereof, said wings having a height which is not greater than the height on the lister plow at which the soil begins to turn laterally whereby said wings will form horizontal gashes in the bottom of the ridges without moving the soil laterally in the gashes.

3. A lister plow for forming lister furrows and lister ridges, wing extensions on both sides of said lister plow and integral therewith, said wing extensions having cutting edges in the plane of the cutting edges of said lister plow and continuous therewith, the upper convex surfaces of said wing extensions being continuous with the upper surfaces of said lister plow, said wing extensions being upwardly and rearwardly inclined and terminating below the plane which determines the turning point of the furrow slice on said lister plow whereby said wing extensions will cut horizontal gashes at the bottom of the adjacent ridges without lateral movement of the soil.

4. A lister plow having divergent and slightly concave cutting edges in the plane which determines the position of the plow sole, said plow having an upward inclination from front to rear of sufficient height to turn and to move the soil laterally to form ridges at opposite sides of a furrow, wings extending laterally from both sides of said plow and integral therewith, said wings having cutting edges which are continuous with said concave cutting edges of said plow and having upper curved surfaces which are continuous with the upper curved surfaces of said plow whereby the furrow slice will not be subjected to any abrupt turn, the height of said wings being just sufficient for slightly elevating the soil without lateral displacement to cut horizontal gashes in the bottom portions of the ridges.

CHARLES J. RAY.